June 23, 1964
J. B. SPELLER
3,138,800
PHASE DETECTING SYSTEM
Filed June 10, 1960
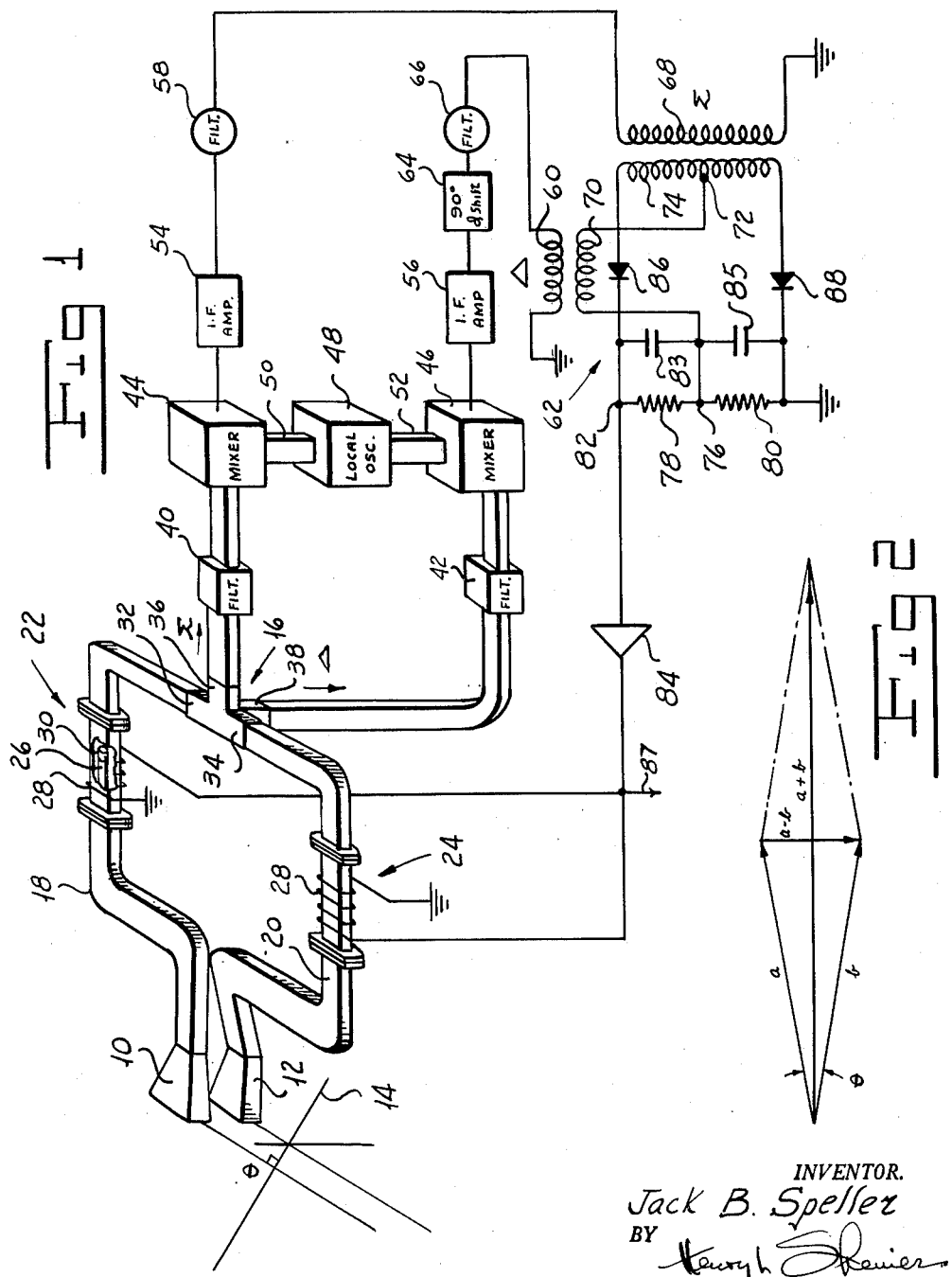
INVENTOR.
Jack B. Speller
BY
ATTORNEY

United States Patent Office 3,138,800
Patented June 23, 1964

---

3,138,800
PHASE DETECTING SYSTEM
Jack B. Speller, Chappaqua, N.Y., assignor to United Aircraft Corporation, East Hartford, Conn., a corporation of Delaware
Filed June 10, 1960, Ser. No. 35,330
1 Claim. (Cl. 343—117)

My invention relates to a phase detecting system and more particularly to an improved phase detecting system which is accurate over a wide range of phase differences.

In a monopulse radar system such as that disclosed in the co-pending application of Wood et al., Serial No. 859,489, filed December 14, 1959, for a Terrain Clearance System, it is necessary to detect over a wide range the angle from which radiation is received as by measuring the phase difference between the radiations received by a pair of spaced horns. It is of course desirable that this be accomplished with a high degree of accuracy.

The undesirable effect of residual phase shifts in a phase detecting system can be minimized by causing a small angular change in direction to produce a large phase difference by employing widely spaced horns. Such an arrangement however introduces the further problem that the phase detector of such a system must operate over such a wide range that its output is nonlinear. No satisfactory solution has been found in the prior art for producing a phase detecting system which is accurate over a wide range of phase differences.

I have invented an improved phase detecting system which is accurate over a wide range of phase differences. The output of my system is linear over the range of differences to be measured. My phase detecting system permits the use of relatively widely spaced horns to overcome the undesirable effect of residual phase shifts on the output of the system.

One object of my invention is to provide a phase detecting system which is accurate over a wide range of phase differences.

Another object of my invention is to provide a phase detecting system the output of which is substantially linear over the range of differences to be measured.

A further object of my invention is to provide a phase detecting system which permits the use of relatively widely spaced horns whereby to overcome the undesirable effect of residual phase shifts on the output of my system.

Other and further objects of my invention will appear from the following description.

In general my invention contemplates the provision of a wide-band phase detecting system comprising a narrow-band phase detector and a variable phase-shifting device. I apply one of the signals whose phase difference is to be determined to the narrow-band detector through the variable phase-shifting device. I also apply the other of the signals to the narrow-band detector to cause the detector to produce an error signal. I employ this error signal to the phase-shifting device to cause the narrow-band detector to operate about a null. Further, this operation of my system permits the use of relatively widely spaced horns.

In the accompanying drawings which form part of the instant specification and which are to be read in conjunction therewith and in which like reference numerals are used to indicate like parts in the various views.

FIGURE 1 is a schematic view of my improved phase detecting system.

FIGURE 2 is a vector diagram showing the relation between the radiation received by the respective upper and lower horns of my phase detecting system.

Referring now to the drawings, my phase detecting system includes an upper horn 10 and a lower horn 12 mounted in spaced relationship and adapted to receive radiation from a microwave radiation phase front indicated schematically at 14. With the radiation impinging on the horns 10 and 12 from the direction indicated in FIGURE 1 the radiation entering the upper horn lags behind the energy entering the lower horn 12. I have represented this condition in FIGURE 2 in which "$a$" represents the energy entering the upper horn 10 while "$b$" represents the energy entering the lower horn 12. The signal produced by the energy entering the upper horn 10 can be represented by the relationship.

(1) $\quad a = \sin\left(wt - \frac{\theta}{2}\right) = A\left(\sin wt \cos \frac{\theta}{2} - \cos wt \sin \frac{\theta}{2}\right)$ In a similar manner the signal produced by the energy entering the lower horn 12 can be represented by the relationship:

(2) $\quad b = A \sin\left(wt + \frac{\theta}{2}\right) = A\left(\sin wt \cos \frac{\theta}{2} + \cos wt \sin \frac{\theta}{2}\right)$ Respective wave guide sections 18 and 20 connect the horns 10 and 12 to a "magic-T" type hybrid junction indicated generally by the reference character 16. I connect controllable microwave phase shifters indicated generally by the reference characters 22 and 24 in the respective sections 18 and 20.

Each of the phase shifters 22 and 24 includes a small diameter ferrite rod 26 disposed within the wave guide section with which the phase shifter is associated. Winding 28 surrounding the guide is adapted to be energized to produce a magnetic field directed longitudinally of rod 26 to induce a phase shift of the energy passing through the shifter. In these devices impedance matching in the phase shifters 22 and 24 can be accomplished by attaching a respective dielectric tip 30 to each end of the ferrite rod 26. The details of the phase shifters 22 and 24 are more fully shown and described in Publication AD 143020 published by the Armed Services Technical Information Agency, Dayton 2, Ohio.

As is known in the art with respective signals applied to the arms 32 and 34 of the junction 16, arm 36 carries a signal representing the sum of the signals applied to arms 32 and 34 while arm 38 carries a signal representing the difference of the signals applied to arms 32 and 34. With the energy received respective by horns 10 and 12 applied to arms 32 and 34 by wave guide sections 18 and 20, arm 38 carries a signal which may be represented by the relationship:

(3) $\quad a - b = -2A \cos wt \sin \frac{\theta}{2}$

The output of arm 36 can be represented by the relationship:

(4) $\quad a + b = 2A \sin wt \cos \frac{\theta}{2}$

I pass the energy from the respective arms 36 and 38 through filters 40 and 42, which eliminate unnecessary phase variations, to mixers 44 and 46. A local oscillator 48 supplies the mixers 44 and 46 through respective wave guide sections 50 and 52. The oscillator 48 and the mixers 44 and 46 may be of any suitable type known to the art. I amplify the intermediate frequency output signals from the mixers 44 and 46 by amplifiers 54 and 56. A filter 58 couples the sum signal output of amplifier 54 to one input winding 68 of a phase demodulator indicated generally by the reference character 62. For proper phase comparison I shift the intermediate frequency difference output signal of amplifier 56 through 90° by a phase shifting network 64. A filter 66 couples the output of the phase shifter 64 to a second input winding 60 of the circuit 62. I connect a secondary winding 70, inductively coupled to winding 60, between a center tap 72 of a secondary winding 74 coupled to winding 68 and the common terminal 76 of a pair of voltage dividing resistors 78 and 80. I connect respective capacitors 83 and 85 in parallel with resistors 78 and 80. Diodes 86 and 88 connect the winding 78 across the voltage dividing resistors 78 and 80. As is known in the art in operation of the phase detector 62, its output terminal 82 is adapted to carry a signal representing the magnitude and sense of the difference signal applied to winding 60.

I provide my system with a high gain amplifier 84 which amplifies the signal at terminal 82 and which applies this signal to the windings 28 of the phase shifters 22 and 24. I so arranged this system that the shifters 22 and 24 produce phase shifts in opposite directions with the result that in the operation of my phase detecting system a signal of the type indicated in Equation 4 is applied to the winding 68. A channel 87 carries the useful output of the system from amplifier 84 to the vertical deflection control of a display tube such as is shown in the copending application referred to hereinabove.

Since the signal from the amplifier 56 is shifted through 90° by the element 64 the signal applied to winding 60 may be represented by the expression:

$$(5) \qquad a - b = -2A \sin wt \sin \frac{\theta}{2}$$

Since the sum signal applied to the winding 68 is large, as is known in the art the output of the circuit 62 at the terminal 82 will be $$\sin \frac{\theta}{2}$$

As will be apparent from the showing of FIGURE 2 if the angle $\theta$ is very small $$\sin \frac{\theta}{2} \text{ is almost equal to } \frac{\theta}{2}$$

Amplifier 84 amplifies the output signal from the circuit 62 and applies the amplified output to the windings 28 of the phase shifters 24 and 26 in such a direction as to cause the signals applied to the arms 32 and 34 to be very nearly in phase. Thus, the output of the amplifier at all times provides a measure of the phase difference between the two signals received by the horns 10 and 12. In this manner the $$\frac{\theta}{2}$$

term at the output of the magic-T junction 16 is kept to a very small value with the result that the circuit 62 operates substantially at a null. The output of the circuit is linear and transducers which are accurate over a wide range can be used. That is, with my arrangement the phase detector 62 is not required to operate over a wide range and yet relatively widely spaced horns 10 and 12 can be employed whereby to minimize the undesirable effect of residual phase shifts in the system.

In operation of my phase detecting system radiation from the front 14 impinging on the horns 10 and 12 produces respective signals in the guides 18 and 20. Assuming that no current flows in the windings 28 of the shifters 22 and 24 the signals in guides 18 and 20 pass to the junction 16 and cause respective sum and difference signals in the output arms 36 and 38. Both the sum and difference signals are reduced to an intermediate frequency and are then amplified. The amplified sum signal is applied directly to the winding 68 of the phase-sensitive demodulator 62 while the difference signal is first shifted through 90° and then is applied to winding 60 of the demodulator. As has been explained hereinabove the device 62 produces at its output terminal 82, a signal which is a measure of the magnitude and sense of the difference input signal. The output signal of the device 62 is amplified and applied to the windings 28 of the shifters 22 and 24 in such direction as to reduce the phase difference of the signals applied to the junction 16 to a very small value so that the comparator operates substantially at a null. The output of amplifier 84 then is a signal which is a measure of the phase difference of the radiation received by the respective horns 10 and 12. This output signal of amplifier 84 thus affords a measure of the direction from which the radiation emanates.

It will be seen that I have accomplished the objects of my invention. I have provided a phase detecting system which operates over a wide range of phase differences with a high degree of accuracy. The output of my phase detecting system is substantially linear. My system permits relatively widely spaced feed horns to be employed.

It will be understood that certain features and subcombinations are of utility and may be employed without reference to other features and subcombinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, what I claim is:

A phase-detecting system including in combination a source of a first signal, a source of a second signal, means for shifting the phase of said first signal in one sense, means for shifting the phase of said second signal in the opposite sense, means for producing a third signal which is the sum of said first and second signals, means for producing a fourth signal which is the difference between said first and second signals, means responsive to said third and fourth electrical signals for producing an error signal representing the magnitude and sense of said fourth signal and means responsive to said error signal for actuating said phase-shifting means to bring said first and second signals into phase to cause said phase-difference determining means to operate about a null.

References Cited in the file of this patent
UNITED STATES PATENTS

| | | |
|---|---|---|
| 2,166,991 | Guanella | July 25, 1939 |
| 2,619,635 | Chait | Nov. 25, 1952 |
| 2,979,713 | Fleming-Williams | Apr. 11, 1961 |

OTHER REFERENCES

I.R.E. Transactions on Aeronautical and Navigational Electronics, vol. ANE 3, No. 2, June 1956, pp. 67–70.

Proceedings of the I.R.E., June 1959, pp. 1130–1132.